United States Patent
Hsu

(10) Patent No.: US 8,422,800 B2
(45) Date of Patent: Apr. 16, 2013

(54) DEBLOCK METHOD AND IMAGE PROCESSING APPARATUS

(75) Inventor: Jeng-Yun Hsu, Hsin Chu (TW)

(73) Assignee: Silicon Integrated Systems Corp., Hsin Chu (TW)

( * ) Notice: Subject to any disclaimer, the term of this patent is extended or adjusted under 35 U.S.C. 154(b) by 1040 days.

(21) Appl. No.: 12/403,089

(22) Filed: Mar. 12, 2009

(65) Prior Publication Data

US 2010/0177983 A1 Jul. 15, 2010

(30) Foreign Application Priority Data

Jan. 15, 2009 (TW) ............................. 98101315 A

(51) Int. Cl.
*G06K 9/36* (2006.01)
*G06K 9/40* (2006.01)
*G06K 9/46* (2006.01)
*H04N 7/12* (2006.01)
*H04N 11/02* (2006.01)
*H04N 11/04* (2006.01)

(52) U.S. Cl.
USPC ....... 382/232; 382/202; 382/264; 375/240.29

(58) Field of Classification Search .................. 382/232, 382/236, 261, 264, 202; 348/402.1, 597; 375/240.16, 240.24, 240.29
See application file for complete search history.

(56) References Cited

U.S. PATENT DOCUMENTS

| 6,061,467 | A * | 5/2000 | Michael ........................ 382/151 |
| 6,539,060 | B1 * | 3/2003 | Lee et al. .................. 375/240.29 |
| 7,302,104 | B2 * | 11/2007 | Suino ............................ 382/240 |
| 2004/0001632 | A1 * | 1/2004 | Adachi ........................ 382/224 |
| 2004/0179610 | A1 * | 9/2004 | Lu et al. .................... 375/240.25 |
| 2006/0133689 | A1 * | 6/2006 | Andersson et al. ........... 382/261 |
| 2008/0019605 | A1 * | 1/2008 | Yea et al. ...................... 382/261 |
| 2009/0046930 | A1 * | 2/2009 | Lee et al. ...................... 382/173 |
| 2009/0180026 | A1 * | 7/2009 | Tang et al. .................... 348/607 |
| 2010/0128168 | A1 * | 5/2010 | Zhen et al. .................. 348/420.1 |
| 2010/0226573 | A1 * | 9/2010 | Lertrattanapanich et al. ............................ 382/168 |

FOREIGN PATENT DOCUMENTS

JP 2005-12641 1/2005

OTHER PUBLICATIONS

Hadar et al. ("Enhancement of an image compression algorithm by pre- and post-filtering," OPt. Eng. 40(2), Feb. 2001, pp. 193-199).*

* cited by examiner

*Primary Examiner* — Yubin Hung
(74) *Attorney, Agent, or Firm* — Muncy, Geissler, Olds & Lowe, PLLC

(57) ABSTRACT

A deblock method for processing at least one image including a plurality of pixels. The method comprises the step of determining a shift amount of block boundary by pixel data differences between adjacent pixels and thereby determining block boundaries between macroblocks in the image, and the step of optionally performing a deblock process on the block boundaries.

30 Claims, 12 Drawing Sheets

| | b1 | b2 | b3 | b4 | b5 | b6 | b7 | b8 |
|---|---|---|---|---|---|---|---|---|
| r1(C1~C8) | 0 | 0 | 0 | 0 | 1 | 0 | 0 | 0 |
| r1(C9~C16) | 0 | 0 | 0 | 0 | 1 | 0 | 0 | 0 |
| r1(C17~C24) | 0 | 0 | 0 | 0 | 1 | 0 | 0 | 0 |
| r2(C1~C8) | 0 | 0 | 0 | 0 | 1 | 0 | 0 | 0 |
| r2(C9~C16) | 0 | 0 | 0 | 0 | 1 | 0 | 0 | 0 |
| r2(C17~C24) | 0 | 0 | 0 | 0 | 1 | 0 | 0 | 0 |
| r3(C1~C8) | 0 | 0 | 0 | 0 | 1 | 0 | 0 | 0 |
| r3(C9~C16) | 0 | 0 | 0 | 0 | 0 | 0 | 0 | 0 |
| r3(C17~C24) | 0 | 0 | 0 | 0 | 1 | 0 | 0 | 0 |
| r4(C1~C8) | 0 | 0 | 0 | 0 | 1 | 0 | 0 | 0 |
| r4(C9~C16) | 0 | 0 | 0 | 0 | 1 | 0 | 0 | 0 |
| r4(C17~C24) | 0 | 0 | 0 | 0 | 1 | 0 | 0 | 0 |
| r5(C1~C8) | 0 | 0 | 0 | 0 | 1 | 0 | 0 | 0 |
| r5(C9~C16) | 0 | 0 | 0 | 0 | 1 | 0 | 0 | 0 |
| r5(C17~C24) | 0 | 0 | 0 | 0 | 1 | 0 | 0 | 0 |
| r6(C1~C8) | 0 | 0 | 0 | 0 | 1 | 0 | 0 | 0 |
| r6(C9~C16) | 0 | 0 | 0 | 0 | 1 | 1 | 0 | 0 |
| r6(C17~C24) | 0 | 0 | 0 | 0 | 1 | 0 | 1 | 0 |
| r7(C1~C8) | 0 | 0 | 0 | 0 | 1 | 0 | 0 | 1 |
| r7(C9~C16) | 0 | 0 | 1 | 0 | 0 | 0 | 0 | 1 |
| r7(C17~C24) | 1 | 0 | 0 | 0 | 1 | 1 | 0 | 0 |
| r8(C1~C8) | 0 | 0 | 0 | 0 | 1 | 1 | 1 | 0 |
| r8(C9~C16) | 0 | 1 | 0 | 0 | 1 | 0 | 0 | 0 |
| r8(C17~C24) | 0 | 0 | 0 | 0 | 1 | 0 | 0 | 0 |
| r9(C1~C8) | 0 | 0 | 1 | 0 | 1 | 0 | 0 | 0 |
| r9(C9~C16) | 1 | 0 | 1 | 0 | 1 | 1 | 0 | 1 |
| r9(C17~C24) | 0 | 0 | 1 | 0 | 1 | 0 | 0 | 1 |
| | 2 | 1 | 4 | 0 | 25 | 5 | 2 | 4 |

Fig. 8

|  | b1 | b2 | b3 | b4 | b5 | b6 | b7 | b8 |
|---|---|---|---|---|---|---|---|---|
| r1(C1~C8) | 0 | 0 | 2 | 0 | 2 | 0 | 0 | 0 |
| r1(C9~C16) | 0 | 0 | 4 | 0 | 4 | 0 | 0 | 0 |
| r1(C17~C24) | 0 | 0 | 0 | 0 | 6 | 0 | 0 | 0 |
| r2(C1~C8) | 0 | 0 | 0 | 0 | 8 | 0 | 0 | 0 |
| r2(C9~C16) | 0 | 0 | 0 | 0 | 8 | 0 | 0 | 2 |
| r2(C17~C24) | 0 | 0 | 0 | 0 | 8 | 0 | 0 | 4 |
| r3(C1~C8) | 0 | 0 | 0 | 0 | 8 | 0 | 0 | 0 |
| r3(C9~C16) | 0 | 0 | 0 | 0 | 8 | 2 | 0 | 0 |
| r3(C17~C24) | 0 | 0 | 0 | 0 | 8 | 4 | 0 | 0 | edge_cnt_inc
| r4(C1~C8) | 0 | 0 | 0 | 0 | 0 | 0 | 0 | 0 |
| r4(C9~C16) | 0 | 0 | 0 | 0 | 2 | 0 | 0 | 0 |
| r4(C17~C24) | 0 | 0 | 0 | 0 | 4 | 0 | 0 | 0 |
| r5(C1~C8) | 0 | 0 | 0 | 0 | 6 | 0 | 0 | 0 |
| r5(C9~C16) | 0 | 0 | 0 | 0 | 8 | 0 | 0 | 2 |
| r5(C17~C24) | 0 | 0 | 0 | 0 | 8 | 0 | 0 | 0 |
| r6(C1~C8) | 0 | 0 | 0 | 0 | 8 | 0 | 0 | 0 |
| r6(C9~C16) | 0 | 0 | 0 | 0 | 8 | 2 | 0 | 0 |
| r6(C17~C24) | 0 | 0 | 0 | 0 | 8 | 0 | 2 | 0 |
| r7(C1~C8) | 0 | 0 | 0 | 0 | 8 | 0 | 0 | 2 |
| r7(C9~C16) | 0 | 0 | 0 | 0 | 8 | 0 | 0 | 0 |
| r7(C17~C24) | 2 | 0 | 2 | 0 | 8 | 0 | 0 | 0 |
| r8(C1~C8) | 0 | 0 | 4 | 0 | 0 | 0 | 2 | 0 |
| r8(C9~C16) | 0 | 2 | 0 | 0 | 2 | 0 | 0 | 0 |
| r8(C17~C24) | 0 | 0 | 0 | 0 | 4 | 0 | 0 | 0 |
| r9(C1~C8) | 0 | 0 | 0 | 0 | 6 | 0 | 0 | 0 |
| r9(C9~C16) | 2 | 0 | 0 | 0 | 8 | 2 | 0 | 2 |
| r9(C17~C24) | 0 | 0 | 0 | 0 | 8 | 0 | 0 | 0 |
|  | 4 | 2 | 12 | 0 | 164 | 10 | 4 | 12 | edge_cnt

Fig. 9

DEBLOCK METHOD AND IMAGE PROCESSING APPARATUS

This application claims priority of application No. 098101315 filed in Taiwan R.O.C on Jan. 15, 2009, the entire contents of which are hereby incorporated by reference.

BACKGROUND OF THE INVENTION (a) Field of the Invention

The invention relates to an image processing apparatus and a method thereof, particularly to an image processing apparatus and a method to remove the block effect in an image.

(b) Description of the Related Art

During image transmission, generally the image to be transmitted will be compressed to decrease the usage of network bandwidths and MPEG (Moving Picture Experts Group) is one commonly used image compression technique.

FIG. 1 shows a schematic diagram illustrating a local image comprising four macroblocks. During image compression, the MPEG technique treats each 8×8 macroblock as one unit to do compression. During decompression, an 8×8 macroblock 12 is used as one decoded unit to decode. However, the decompressed image sometimes indistinctly shows comprising a plurality of blocks, called "block effect" or "mosaic phenomenon".

The reason for having the block effect will be described as follows. As the original image is compressed by the MPEG technique, one 8×8 macroblock is used as one coded unit to do compression. Since most of high-frequency information are eliminated during quantization, the compressed macroblock comprises mostly only low-frequency information (direct-current (DC) coefficients such as average luminance). If the compressed macroblocks are decoded to form the image 11, due to certain difference existed between average luminance of two macroblocks, the luminance difference between the pixel 125 and the pixel 124 near the block boundary 13 will be excessively large and thus the block effect appears.

On the other hand, in the process of transmitting the image signal comprising a plurality of programs, due to various reasons, some adjacent pixels of the original image sometimes will be deleted and the number of the deleted rows or columns of pixels for each program will be different. During program switching, the back-end image processing apparatus may not predict the block boundary between adjacent macroblocks in the image correctly to smoothly perform a deblock process. Taking the image 11 shown in FIG. 1 as one example, the image 11 is the upper left local image of a complete image where the pixels of the four columns shown by dashed lines on the farthest left represent the deleted pixels and thus the block boundary 13 disposed between the eighth column and the ninth column in the original image become being disposed between the fourth column and the fifth column in the processed image.

In order to remove the block effect, that is, to have all the block boundaries 13 be blurred, the optimum method is to provide a deblock filter in a MPEG II decoder since the MPEG II decoder receives MPEG data streams that have the related information of the block boundaries and can decode MPEG data streams and correctly determine the boundary location of adjacent blocks. Therefore, the deblock filter can remove the block effect at the correct position.

However, regardless of whether MPEG data streams can be received or not, the above mentioned block effect exists in all of the image processing apparatuses. How to correctly determine the boundary between adjacent blocks even under the condition of being unable to receive MPEG data streams to further remove the block effect is a big challenge for the industry.

BRIEF SUMMARY OF THE INVENTION

One object of an embodiment of the invention is to provide a deblock method and an image processing apparatus to precisely determine the position of the block boundary of adjacent blocks to thereby remove the above mentioned block effect.

One embodiment of the invention provides a deblock method for processing at least one image that comprises a plurality of pixels. The method comprises the following steps: determining a shift amount of block boundary of the image by utilizing pixel data differences between adjacent pixels in a first direction to thereby determine block boundaries of a second direction between adjacent macroblocks in the image; and optionally performing a deblock process in the first direction on the block boundaries of the second direction; where the first direction is either a horizontal or vertical direction and the second direction is perpendicular to the first direction. In one embodiment, the method further comprises: determining whether the shift amount of block boundary is reliable or not to thereby decide the value of a filter selection signal. Preferably, the step of optionally performing a deblock process on the block boundaries comprises optionally performing a deblock process in the first direction on the block boundaries of the second direction according to the filter selection signal.

One embodiment of the invention provides an image processing apparatus for processing at least one image. The image processing apparatus comprises a block boundary determining device and a deblock filter. Preferably, the apparatus further comprises a filter control device. The block boundary determining device utilizes pixel data differences between adjacent pixels in a first direction to acquire a shift amount of block boundary of the image to thereby determine block boundaries of a second direction between adjacent macroblocks in the image. The deblock filter optionally performs a deblock process in the first direction on the block boundaries of the second direction. The first direction is either a horizontal or vertical direction while the second direction is perpendicular to the first direction. In one embodiment, the deblock filter optionally performs a deblock process in the first direction on the block boundaries of the second direction according to the filter selection signal. In one embodiment, the deblock filter is a low-pass filter.

According to the above mentioned deblock method and image processing apparatus, the position of the block boundary of adjacent blocks can be determined precisely and thus the image processed by the deblock method can have better image quality.

Other objects and advantages of the invention can be better understood from the technical characteristics disclosed by the invention. In order to clarify the above mentioned and other objects and advantages of the invention, examples accompanying with figures are provided and described in details in the following.

BRIEF DESCRIPTION OF THE DRAWINGS

FIG. 8 shows a schematic diagram illustrating the pixel boundary characteristic value of each pixel in FIG. 7.

FIG. 9 shows a schematic diagram illustrating the pixel boundary characteristic value of each pixel in FIG. 7 after weighted and the accumulated weight of each group according to one embodiment of the invention.

DETAILED DESCRIPTION OF THE INVENTION

The above and other technical content, characteristics, and functions of the invention will be described in details with reference to the drawings. For clarity, the wording related to direction, such as up, down, left, right, front, back, etc., used in examples is referred to the direction in drawings. Therefore, the wording related to direction is not used to limit the scope of the invention.

Under the condition of being unable to receive MPEG data streams, an embodiment of the invention uses the characteristic of relatively large difference between the average luminance (or DC coefficient) of two macroblocks and breaks down the statistics of luminance differences between adjacent pixels in the image to determine each block boundary of the image, and then makes the block boundaries be blurred so as to decrease the block effect to thereby obtain better image quality.

Figure 1:
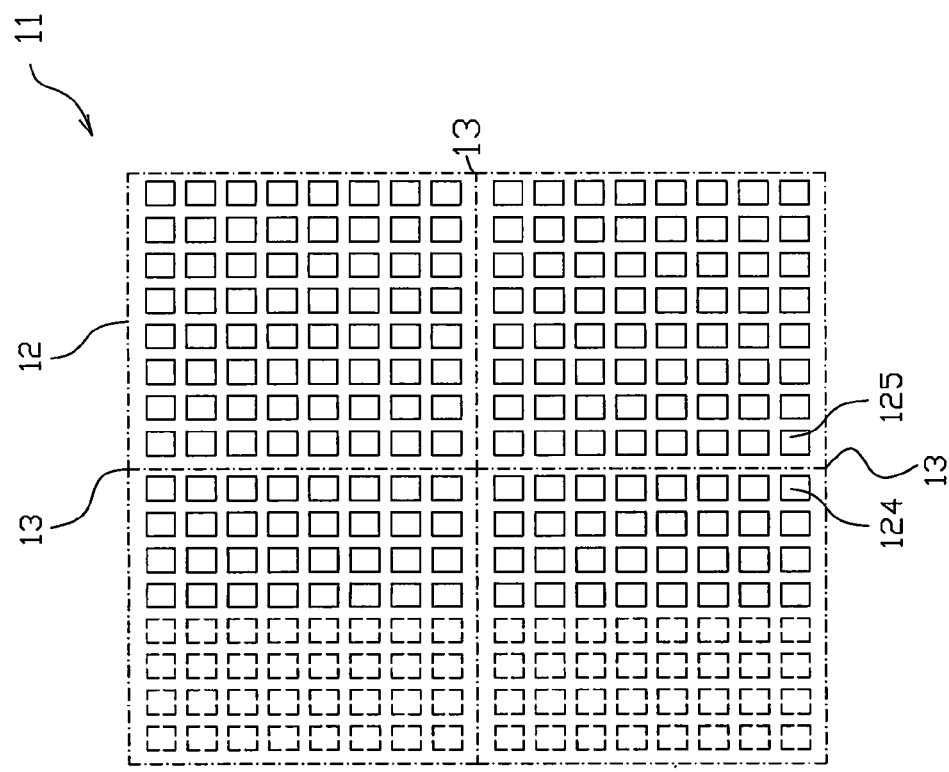
FIG. 1 shows a schematic diagram illustrating a local image comprising four macroblocks.
Figure 2:
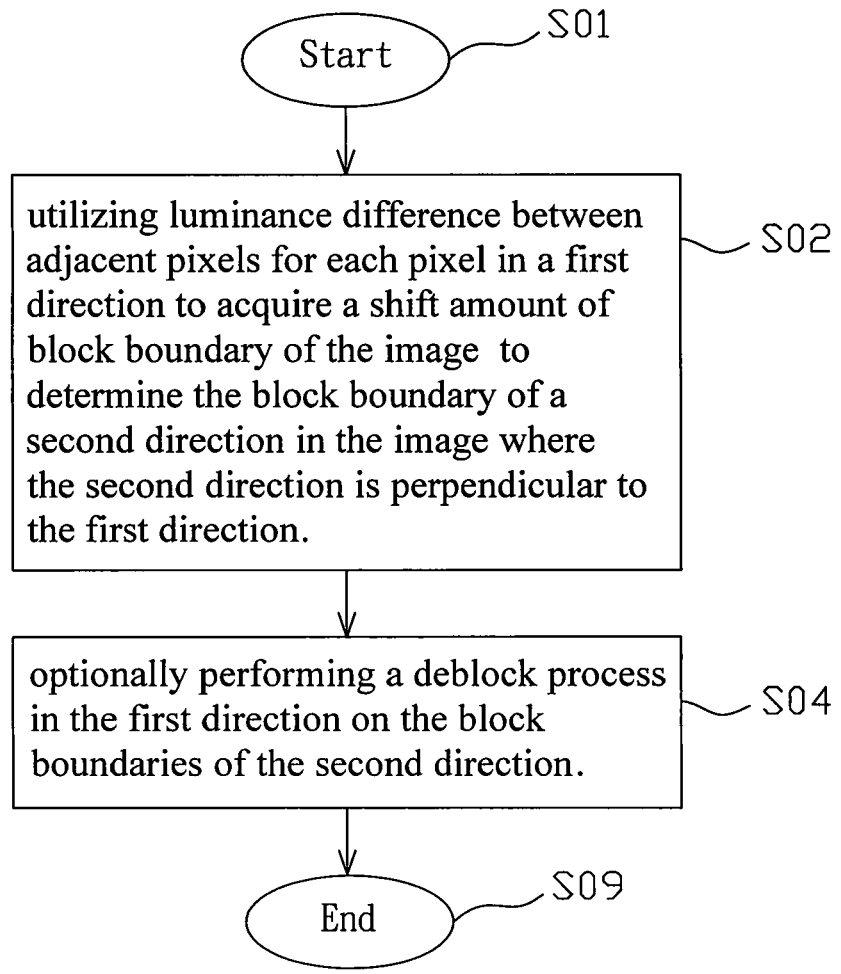
FIG. 2 shows a flow chart of the deblock method according to one embodiment of the invention.

FIG. 2 shows a flow chart of the deblock method according to one embodiment of the invention. According to one embodiment of the invention, the deblock method is to process an image (field or frame). The image comprises a plurality of pixels. The deblock method comprises:

Step S02: utilizing luminance difference between adjacent pixels for each pixel in a first direction (either horizontal or vertical direction, in this embodiment being the horizontal direction) to acquire a shift amount of block boundary of the image (that is, block boundary position) to determine the block boundary of a second direction in the image where the second direction is perpendicular to the first direction; and Step S04: optionally performing a deblock process in the first direction on the block boundaries of the second direction.

In another embodiment, the step S02 acquires a shift amount of block boundary of the image by utilizing chrominance differences between adjacent pixels in a first direction to determine the block boundary of the second direction in the image.

Figure 3:
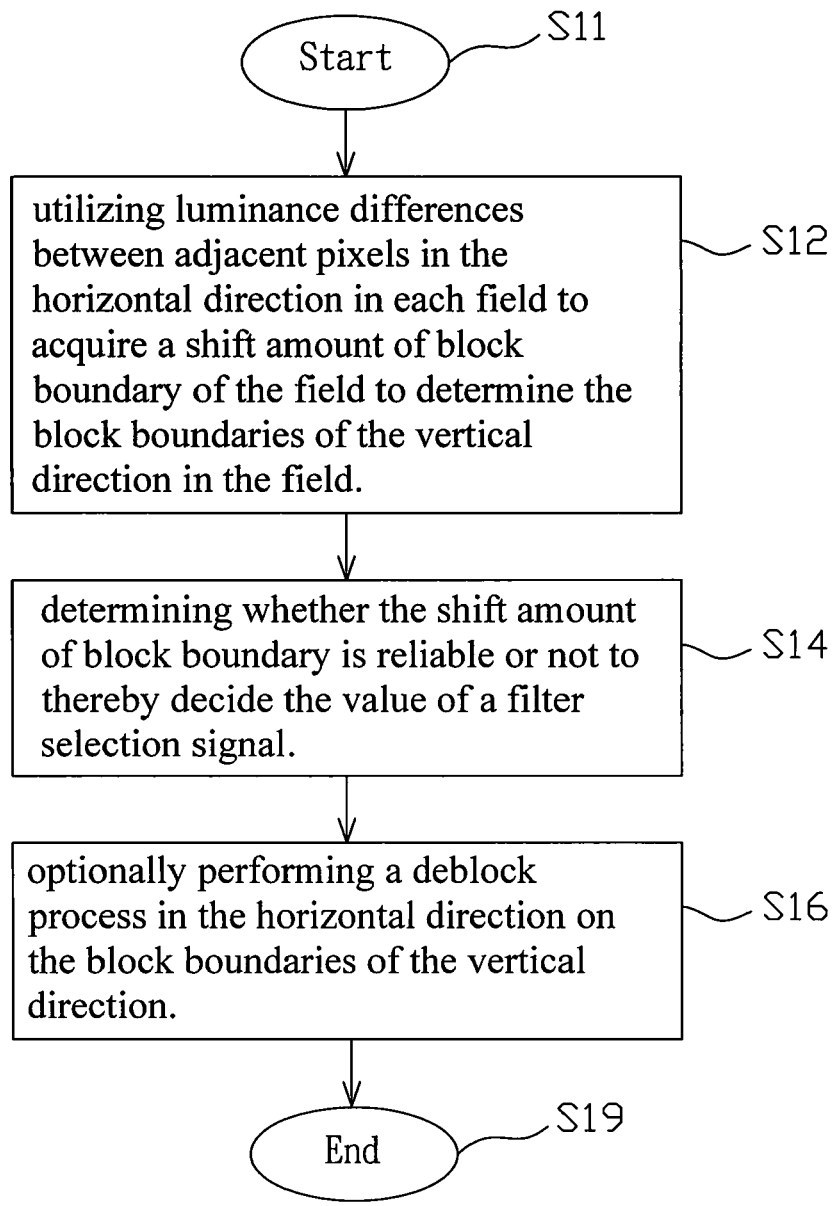
FIG. 3 shows a flow chart of the deblock method according to one embodiment of the invention.

FIG. 3 shows a flow chart of the deblock method according to one embodiment of the invention. According to one embodiment of the invention, the deblock method is to process a video. The video comprises a plurality of fields and each field comprises a plurality of pixels. The method comprises:

Step S12: utilizing luminance differences between adjacent pixels in the horizontal direction in each field to acquire a shift amount of block boundary of the field to determine the block boundaries of the vertical direction in the field;

Step S14: determining whether the shift amount of block boundary is reliable or not to thereby decide the value of a filter selection signal; and Step S16: optionally performing a deblock process in the horizontal direction on the block boundaries of the vertical direction. In one embodiment, the deblock process in the horizontal direction on the block boundaries of the vertical direction is optionally performed according to filter selection signal. Besides, the value of the filter selection signal comprises an enable filter value or a disable filter value which will be described later.

Figure 4:
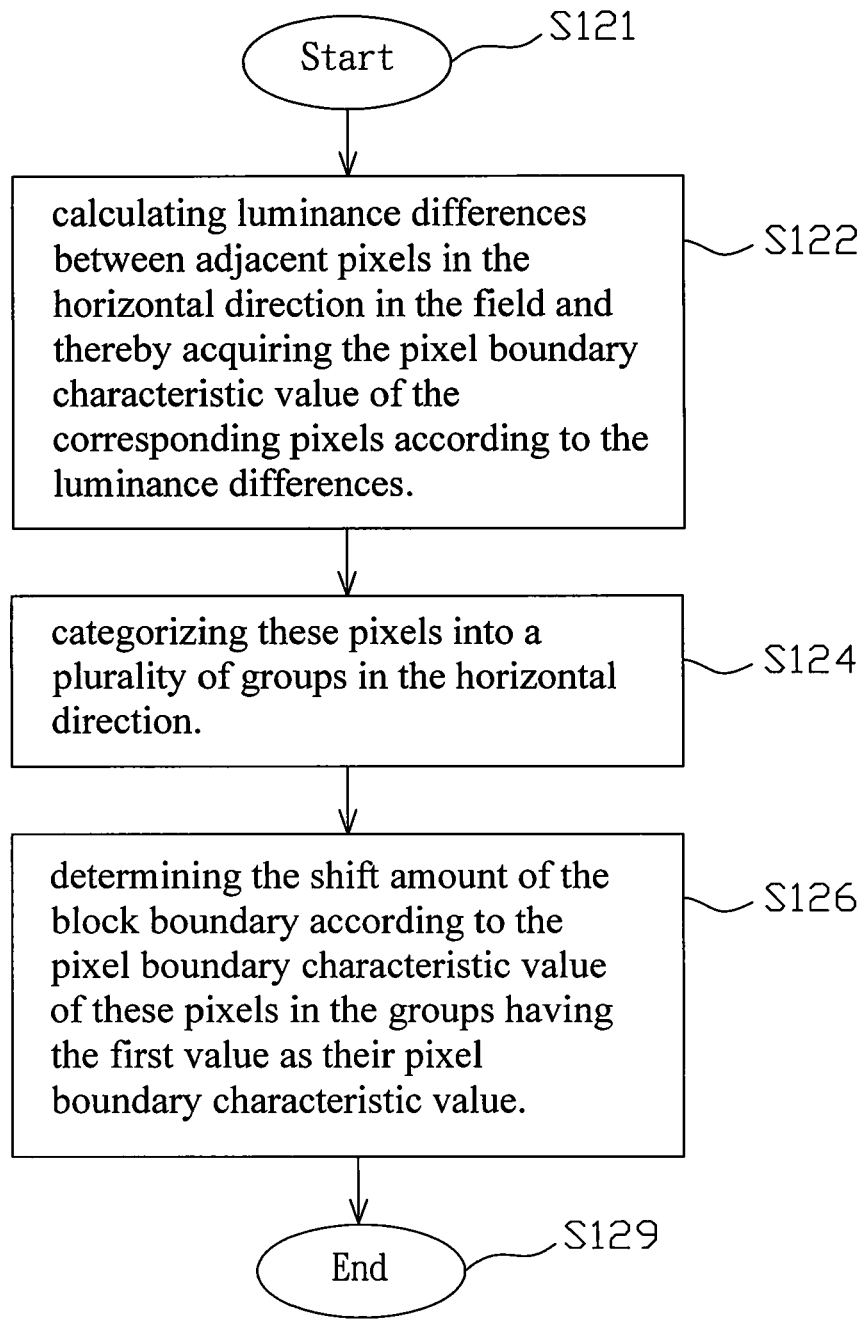
FIG. 4 shows a flow chart of the method for determining a plurality of block boundaries of a field according to one embodiment of the invention.
Figure 5:
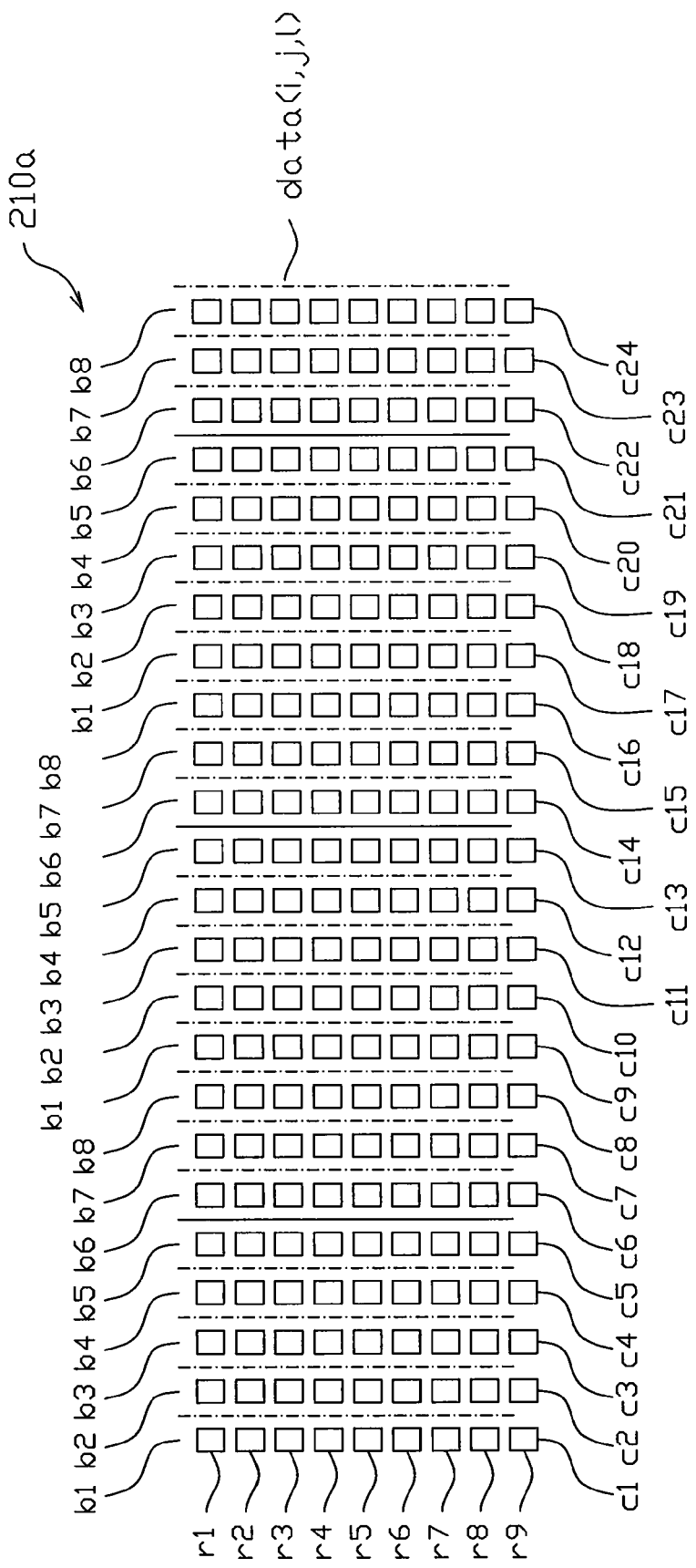
FIG. 5 shows a schematic diagram illustrating a field of a video according to one embodiment of the invention.
Figure 6:
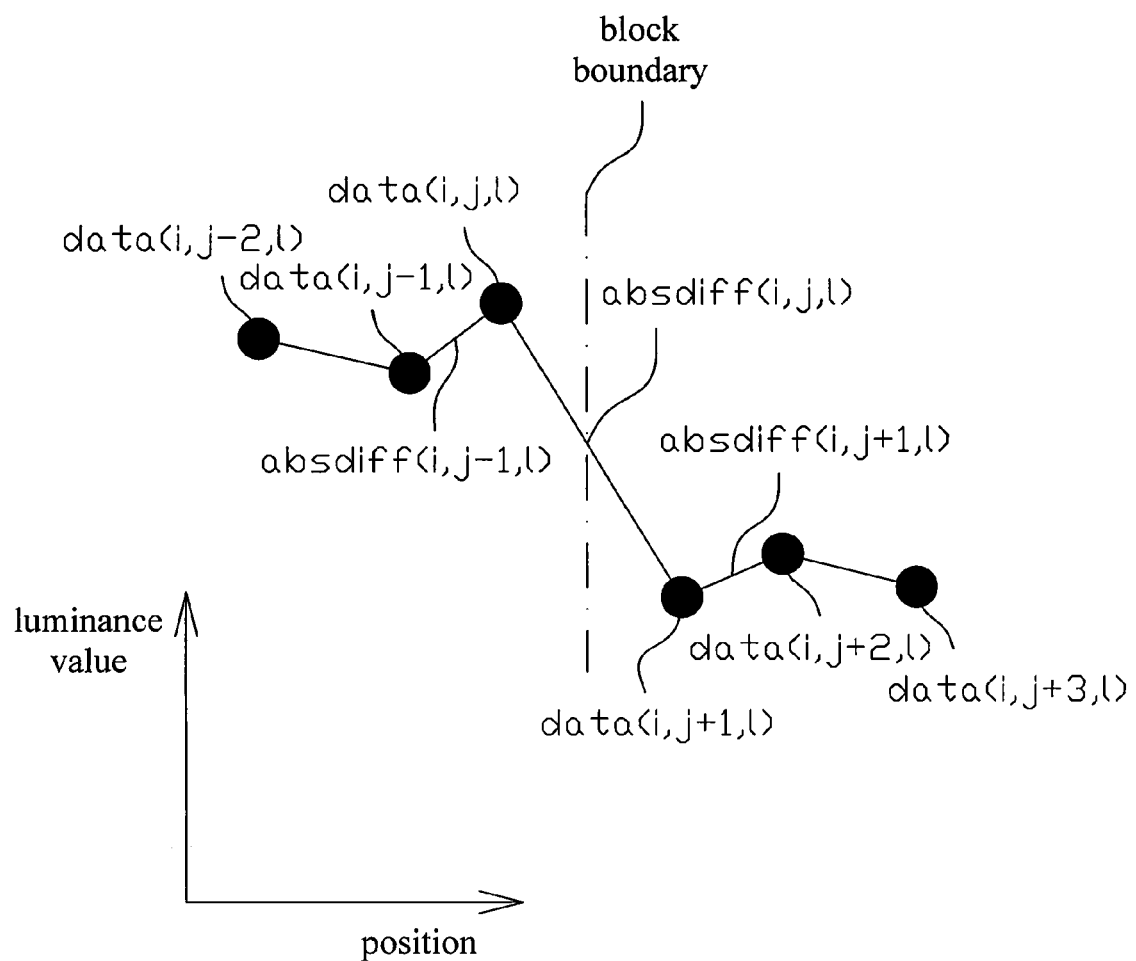
FIG. 6 shows a schematic diagram illustrating the relationship between the luminance value and the position between pixels near the block boundary.

FIG. 4 shows a flow chart of the method for determining a plurality of block boundaries of the vertical direction of a field according to one embodiment of the invention. FIG. 5 shows a schematic diagram illustrating a plurality of pixels of a field of a video. The field 210a comprises a plurality of pixels. data(i,j,k) represents the pixel data of the pixel at the row coordinate i and the column coordinate j. The pixel data can be luminance or chrominance. For example, it represents luminance Y for k=1; it represents chrominance U for k=2; and it represents chrominance V for k=3. It should be noted that for clarity FIG. 5 shows a field comprising only pixels of column c1~c24 and row r1~r9 as the example. FIG. 6 shows the relationship between the luminance value and the position between pixels near the block boundary. Referring to FIGS. 4~6, the method for determining the block boundary of the vertical direction in a field according to one embodiment of the invention comprises steps S122, S124, and S126.

Step S122: calculating luminance differences between adjacent pixels in the horizontal direction in the field and thereby acquiring the pixel boundary characteristic value of the corresponding pixels according to the luminance differences. In this embodiment, the pixel boundary characteristic value of the pixel is acquired according to whether the luminance difference between adjacent pixels in the horizontal direction satisfies a boundary characteristic relation or not. As the condition is satisfied, the pixel boundary characteristic value of the pixel is a first value 1. As the condition is not satisfied, the pixel boundary characteristic value of the pixel is a second value 0. The boundary characteristic relation is not limited to the above example. Those who are skilled in the art can set the relation according to product needs.

Referring to FIG. 6, the luminance difference of the pixel data of two adjacent pixels data(i,j,1) and data(i,j+1,1) is absdiff(i,j)=abs(data(i,j,1)−data(i,j+1,1)) where abs( ) represents the absolute value function.

The pixel boundary characteristic value of each pixel is represented by edgeh(i,j). Since the luminance difference of the pixel data data(i,j,1) and data(i,j+1,1) between two adjacent pixels near the block boundary is relatively large, the boundary characteristic relation may comprise the condition (1) that the luminance difference absdiff(i,j) is larger than a first threshold value th1. For example, edgeh(i,j)=(absdiff(i,j)>=th1). Sometimes black and white blocks or the boundary of objects may appear in a field, in order to prevent misjudgment, the boundary characteristic relation may comprise the condition (2) that the luminance difference absdiff(i,j) is smaller than a second threshold value th2. For example, edgeh(i,j)=(absdiff(i,j)>=th1 && absdiff(i,j)<=th2). For convenience in illustration, the pixel nearest to or next to the boundary is called "boundary pixel". In order to increase the precision of judgment, the condition (3) that the luminance difference absdiff(i,j) between boundary pixels is larger than the luminance differences absdiff(i,j−1) and absdiff(i,j+1) between the boundary pixel and a common pixel. Thus, the boundary characteristic relation comprises the condition (1)~(3), that is, edgeh(i,j)=(absdiff(i,j)>=th1 && absdiff(i,j)<=th2) && absdiff(i,j−1)<=absdiff(i,j)*fract_th && absdiff(i,j+1)<=absdiff(i,j)*fract_th where fract_th is set to a value less than 1 and more than 0 to have absdiff(i,j−1) and absdiff(i,j+1) both be less than absdiff(i,j). As a pixel boundary characteristic value edgeh(i,j) of pixel (i,j) satisfies the boundary characteristic relation, the pixel boundary characteristic value edgeh(i,j) is the first value 1. As a pixel boundary characteristic value edgeh(i,j) of pixel (i,j) does not satisfy the boundary characteristic relation, the pixel boundary characteristic value edgeh(i,j) is the second value 0.

Step S124: categorizing these pixels into a plurality of groups in the horizontal direction.

Step S126: determining the shift amount of the block boundary according to the pixel boundary characteristic value of these pixels in the groups having the first value as their pixel boundary characteristic value.

Figure 7:
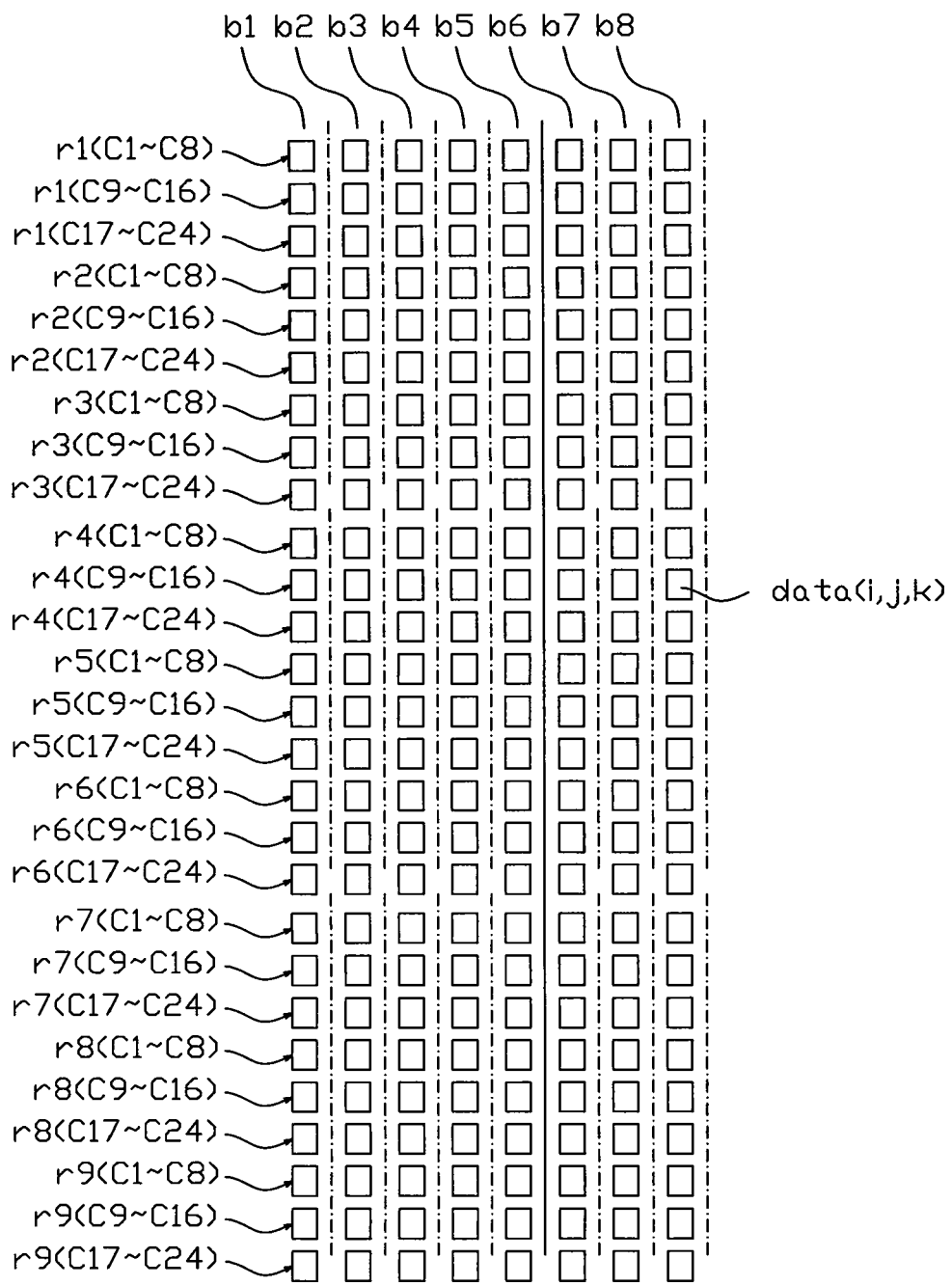
FIG. 7 shows a schematic diagram illustrating the pixels in FIG. 5 categorized into a plurality of groups.

FIG. 7 shows a schematic diagram illustrating the pixels in FIG. 5 being categorized into 8 groups. FIG. 8 shows a schematic diagram illustrating the pixel boundary characteristic value of each pixel in FIG. 7 where the pixels are omitted to clearly show the pixel boundary characteristic value. As shown in FIG. 7 and FIG. 8, every 8 pixels are treated as a period, the pixels in the horizontal direction are categorized into 8 groups b1~b8, and 8 counters are used to count the number of the pixels having the first value 1 as the pixel boundary characteristic value edgeh(i,j) in each group. The group having the maximum count is set to be the shift amount of the block boundary to determine the block boundary of the vertical direction. In this embodiment, the group b5 has 25 pixels having the first value 1 as the pixel boundary characteristic value edgeh(i,j), that is, the maximum count, and thus the group b5 is set to be the shift amount of the block boundary, Referring to FIG. 7, according to the group b5 by taking 8 pixels as one unit, the block boundaries of the vertical direction between c5~c6, c13~14, c21~c22 can be distinguished (shown by solid lines in FIG. 7).

In one embodiment, furthermore a weighting relation can be used to increase the weight of the pixel boundary characteristic value of the pixels having the first value 1 as their pixel boundary characteristic values to increase the difference between the block boundary and pixel boundary. Particularly, edge_cnt_inc(idx) represents the weight of the pixel boundary characteristic value edgeh(i,j) and edge_cnt(idx) represents the accumulated weights of each group. As edgeh(i,j) is determined to the second value 0, edge_cnt_inc(idx)=0. As edgeh(i,j) is determined to the first value 1 and edge_cnt_inc(idx) is less than a predetermined value (in this embodiment, being 8), the weight of edgeh(i,j) increases progressively. For example, edge_cnt_inc(idx)=edge_cnt_inc(idx)+inc_th is used to increase the weight of edgeh(i,j) where inc_th is any predetermined value. In this embodiment, inc_th=2. After the each weight edge_cnt_inc(idx) in each group is added up, the accumulated weight of each group edge_cnt(idx) is thus acquired. As the pixels in a field are aligned into a rowsize× colsize matrix, the following program codes can be used to acquire edge_cnt_inc(idx) and edge_cnt(idx). FIG. 9 shows a schematic diagram illustrating the pixel boundary characteristic value of each pixel in FIG. 8 after weighted and the accumulated weight of each group according to one embodiment of the invention. Referring to FIG. 9, an example shown in FIG. 9 uses the following program codes to acquire edge_cnt_inc(idx) and edge_cnt(idx). mod(j,8) is a function to find the remainder of j divided by 8.

```
for i = 1:rowsize
  for j = 1:colsize
    idx= mod(j,8) + 1;
    if(edgeh(i,j) == 0)
        edge_cnt_inc(idx) = 0;
    else
        edgeh_cnt_inc(idx) = edgeh_cnt_inc(idx) + inc_th;
        if (edgeh_cnt_inc(idx) > 8)
           edgeh_cnt_inc(idx) = 8;
        end
        edgeh_cnt(idx) = edgeh_cnt(idx) + edgeh_cnt_inc(idx);
    end
  end
end
```

The maximum max1edgeh and the second maximum max2edgeh of edge_cnt(idx) are acquired and thus the group having the maximum max1edgeh is set to be the shift amount of block boundary blockh_offset to determine the block boundary of the vertical direction in the field. In this embodiment, the group b5 is set to be the shift amount of block boundary blockh_offset. In one embodiment, the following equations can be used to acquire the shift amount of block boundary blockh_offset, the maximum max 1 edgeh and the second maximum max2edgeh.

```
max1edgeh = 1;
max2edgeh = 1;
blockh_offset= 1;
for i = 1 : 8
    if(edgeh_cnt(i) > max1edgeh)
       max2edgeh = max1edgeh;
       max1edgeh = edgeh_cnt(i);
       blockh_offset= i;
    elseif(edgeh_cnt(i) > max2edgeh)
       max2edgeh = edge_cnt(i)
    end
end
```

According to one embodiment of the invention, the step of determining whether the shift amount of block boundary is reliable or not comprises: determining whether the shift amount of block boundary is reliable or not according to the maximum max1edgeh. In this embodiment, whether the maximum max1edgeh is more than a threshold value maxedgeh_th or not is determined or even whether the difference between the maximum max1edgeh and the second maximum max2edgeh is beyond a predetermined value or not is determined. For example, max1edge/(max2edge+minedge_th)>=maxedgeh_ratio_th.

In one embodiment, if the shift amount of block boundary is determined to be unreliable, a degree of unreliability of the shift amount of block boundary blockh_idle_cnt is calculated. In this embodiment, as the shift amount of block boundary is determined to be unreliable, the unreliability blockh_idle_cnt is increased by 1. As blockh_idle_cnt is more than or equal to a predetermined value blockh_idle_cnt_th, blockh_idle_cnt is reset to zero and the value of the filter selection signal blockh_offset_valid is set to 0 to disable the horizontal deblock filter. Thus, the deblock process in the horizontal direction on the block boundaries of the macroblocks is not executed.

In one embodiment, if the shift amount of block boundary is determined to be reliable, a reliability operation can be carried out to calculate a degree of unreliability of the shift amount of block boundary blockh_valid_cnt. In addition, as blockh_valid_cnt is beyond a threshold degree of reliability blockh_invalid_cnt_th, the value of the filter selection signal is set to 1 (enable filter value) to enable the horizontal deblock filter (described later). Thus, the deblock process in the horizontal direction on the block boundaries of the macroblocks is to be executed.

The reliability operation comprises: using the relation between the shift amount of block boundary of the current field and a preceding shift amount of block boundary of a preceding field to calculate the degree of reliability blockh_valid_cnt of the shift amount of block boundary of the current field. Particularly, in one embodiment, whether the shift amount of block boundary in the current field blockh_offset is unequal to the preceding shift amount of block boundary of a preceding field blockh_offset_save or not is to be determined, that is, blockh_offset~=blockh_offset_save. If it is unequal, blockh_valid_cnt is decreased by 1. In addition, when blockh_valid_cnt is less than or equal to a threshold value of reliability blockh_invalid_cnt_th, blockh_valid_cnt is reset to zero and the value of the filter selection signal blockh_offset_valid is set to 0 to disable the horizontal deblock filter. If it is equal, blockh_valid_cnt is increased by 1. In addition, when blockh_valid_cnt is more than or equal to a threshold value of reliability blockh_valid_cnt_th, the value of the filter selection signal blockh_offset_valid is set to 1 to enable the horizontal deblock filter.

For those who are skilled in the art, modification and changes can be made according to the above description. For example, according to one embodiment of the invention, the following program codes can be used to execute the step of determining whether the shift amount of block boundary is reliable or not and to determine the value of a filter selection signal.

```
hratio= max1edge / (max2edge + minedge_th);
if(max1edge > maxedgeh_th&& hratio>= maxedgeh_ratio_th)
    blockh_idle_cnt= 0;
    if(blockh_offset~= blockh_offset_save) &&
                    blockh_valid_cnt> 0)
        blockh_valid_cnt= blockh_valid_cnt-1;
        if (blockh_valid_cnt<= blockh_invalid_cnt_th)
            blockh_valid_cnt= 0;
            blockh_offset_valid= 0;
        end
    else
        blockh_valid_cnt= block_valid_cnt+ 1;
        blockh_offset_save= blockh_offset;
        if(blockh_valid_cnt> blockh_valid_cnt_th)
            blockh_valid_cnt= blockh_valid_cnt_th;
        end
    end
    if(blockh_valid_cnt== block_valid_cnt_th)
        blockh_offset_valid= 1;
    end
else
    blockh_idle_cnt= blockh_idle_cnt+ 1;
    if(blockh_idle_cnt== blockh_idle_cnt_th)
        blockh_idle_cnt= 0;
        blockh_offset_valid= 0
        if(blockh_valid_cnt> 0)
            block_valid_cnt= block_valid_cnt-1;
        end
    end
end
```

In one embodiment of the invention, a horizontal deblock filter is used to optionally perform a deblock process in the horizontal direction on the block boundaries of the vertical direction. The horizontal deblock filter can be a low-pass filter. In one embodiment, the low-pass filter uses a deblocking gain to acquire three adjusting coefficients gain/gain_th, (gain_th−2*gain)/gain_th, and gain/gain_th. These adjusting coefficients, the luminance of a boundary pixel, the luminance of the pixel on the left-hand side of the boundary pixel, and the luminance of the pixel on the right-hand side of the boundary pixel are used to adjust the luminance of the boundary pixel to reduce the luminance difference between macroblocks so as to have the block boundary be blurred. It should be noted that each individual adjusting coefficient can be adjusted for application needs but the sum of all the adjusting coefficients should be equal to 1. The above embodiment uses the luminance of three pixels and the above three adjusting coefficients to adjust or average the luminance of the boundary pixel. In another embodiment of the invention, the luminance of five adjacent pixels (including the boundary pixel itself) in the horizontal direction and five adjusting coefficients (for example, 0.5*gain/gain_th, 0.5*gain/gain_th, (gain_th−2*gain)/gain_th, 0.5*gain/gain_th, and 0.5*gain/gain_th) can be used to adjust the luminance of the boundary pixel.

In one embodiment of the invention, gain_th is set to 128 and the following relation is used to average the luminance of the boundary pixel.

$$data(i,j,l) = (data(i,j-1,l) * gain1(i,j) + data(i,j,l) * (128 - gain1(i,j) *2) + data(i,j+1,l) * gain1(i,j) )/ 128$$

In one embodiment, furthermore, the luminance difference between the boundary pixel and the pixel on the left-hand side thereof and the luminance difference between the boundary pixel and the pixel on the right-hand side thereof can be used to acquire the deblocking gain. In one embodiment, two different deblocking gains can be used to decrease the luminance different between pixels. The larger deblocking gain is used on the boundary pixels to have stronger deblock effect while the smaller deblocking gain is used on the common pixel to have weaker deblock effect.

Figure 10A:
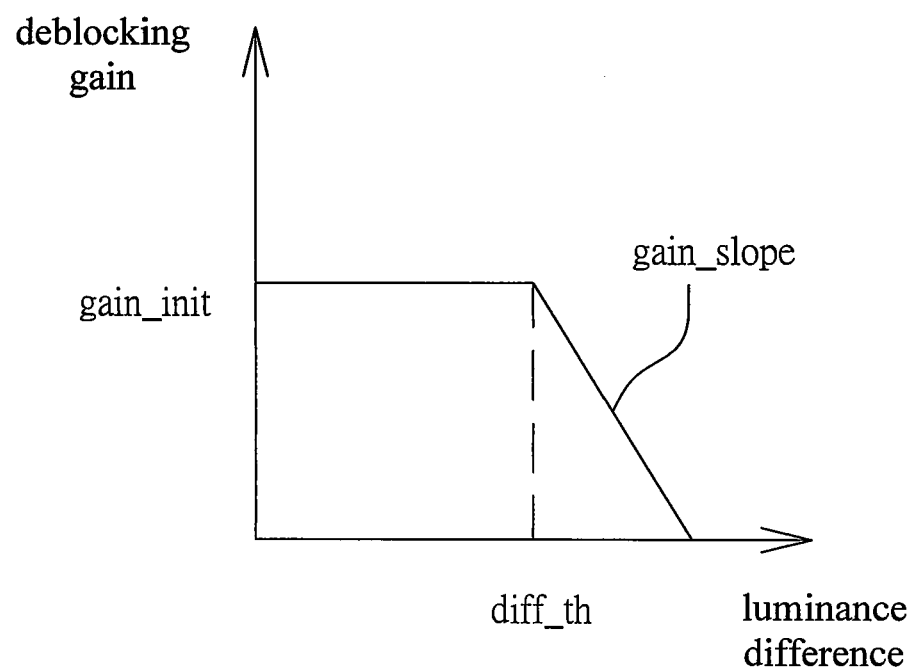
FIG. 10A shows a schematic diagram illustrating the relationship between the deblocking gain and the luminance difference between pixels according to one embodiment of the invention.

FIG. 10A shows the relationship between the deblocking gain and the luminance difference between pixels according to one embodiment of the invention. Referring to FIG. 10A, the luminance difference absdiff_adj(i,j)=(absdiff(i,j−1)+absdiff(i,j)*2+absdiff(i,j+1))*0.5. As the luminance difference absdiff_adj(i,j) is less than or equal to a predetermined threshold value diff_th, because the luminance difference mainly is caused by crossing the block boundary, the first deblocking gain gain1(i,j) is a predetermined gain initialized value gain_init and the largest deblocking gain is used to acquire the strongest deblock effect. As the luminance difference absdiff_adj(i,j) is more than a predetermined threshold value diff_th, it means that the luminance difference is caused by not only crossing the block boundary but also the luminance difference between pixels in the block and thus the strong deblock effect is not needed. Thus, the first deblocking gain gain1(i,j) is decreased progressively, referring to the following equation: gain1(i,j)=gain_init−(absdiff_adj(i,j)−diff_th)*gain_slope where gain_slope is set to any predetermined value. Furthermore, the second deblocking gain gain2(i,j) can be set to a value less than the first deblocking gain gain1(i,j). For example, gain2(i,j)=gain1(i,j)*gain2_factor where gain2_factor is any value less than 1 and more than 0. From the trend, the more the deblocking gains gain1(i,j) and gain2(i,j), the stronger the deblock effect by the deblock filter.

Figure 10B:
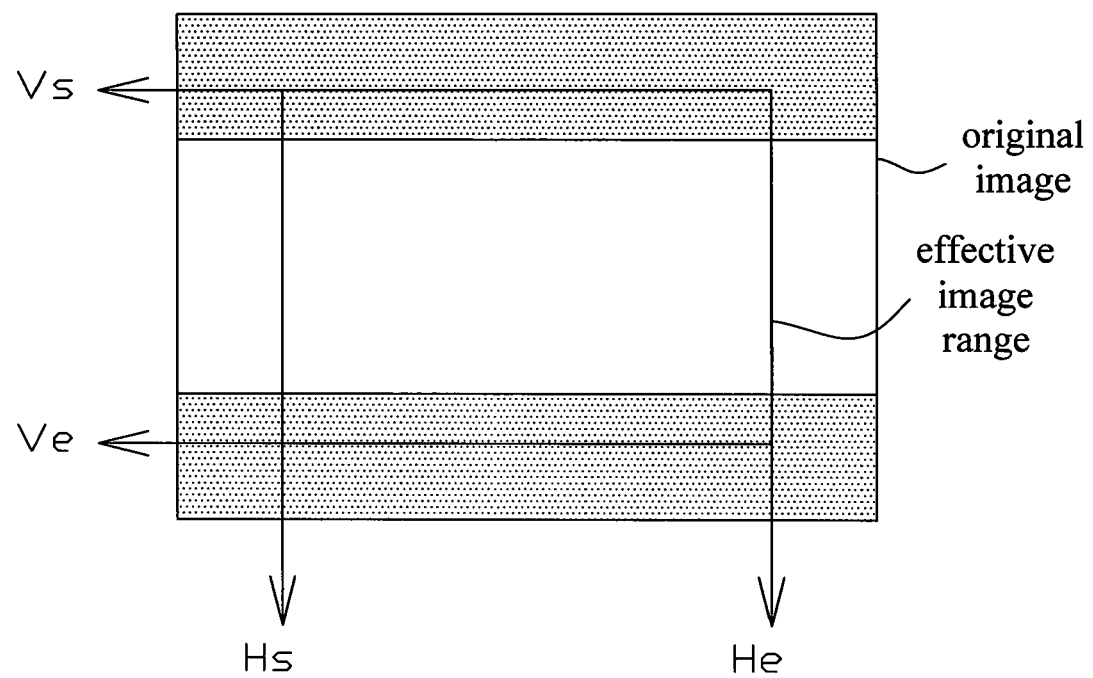
FIG. 10B shows a schematic diagram illustrating the relationship between the original image and the effective image range defined by Vs, Be, Hs, and He.

On the other hand, by determining whether the whole field is apt to motion, high motion, or low motion, the invention dynamically adjusts the deblocking gains gain1(i,j) and gain2(i,j) to thereby achieve different deblock effect. FIG. 10B shows the relationship between the original image and the effective image range defined by Vs, Ve, Hs, and He. According to one embodiment of the invention, within the effective image range between the current field cur and the second preceding field pre2, the following program codes are used to calculate the total count diff_cnt of the pixels having the absolute value of the luminance difference y_diff(i,j,1)=(abs(data(cur,i,j,1)−data(pre2,i,j,1)) more than a luminance threshold value y_th.

```
diff_cnt = 0;
for i =Hs : He      % horizontal range of the effective image range
   for j = Vs : Ve      % vertical range of the effective image range
      if (y_diff(i,j,1) > y_th)
         diff_cnt = diff_cnt + 1;
      end
   end
end
```

Then, the pixel count diff_cnt is used to determine whether the current field cur is apt to motion, high motion, or low motion. For example, as diff_cnt is larger than a predetermined value hmot_th, it represents high motion. As diff_cnt is between the predetermined value hmot_th and another predetermined value mot_th, it represents motion. As diff_cnt is smaller than mot_th, it represents low motion. Thus, the parameters gain_init and diff_th in FIG. 10A are adjusted accordingly. Moreover, the deblocking gains gain1(i,j) and gain2(i,j) are thus adjusted, as shown in the following program codes.

```
if (diff_cnt > hmot_th) % high motion
   gain_init = gain_init_hmot;
   diff_th = diff_th_hmot;
elseif (diff_cnt > mot_th) % motion
   gain_init = gain_init_mot;
   diff_th = diff_th_mot;
else % low motion
   gain_init = gain_init_lmot;
   diff_th = diff_th_lmot;
end
```

In the above, hmot_th, mot_th, gain_init_hmot, gain_init_mot, gain_init_lmot, diff_th_hmot, diff_th_mot, and diff_th_lmot are predetermined values, that can be set according to needs of different products. In addition, hmot_th>mot_th, gain_init_hmot≧gain_init_mot≧gain_init_lmot and diff_th_hmot≧diff_th_mot≧diff_th_lmot. As the motion of the current field cur is more excessive, the error residual generated during the MPEG motion compensation is larger. It tends to use a large quantization step during quantization. Thus, the block effect will be more significant and the stronger deblock process is needed. On the contrary, if the current field cur tends to be static, the block effect is smaller and thus the moderate deblock process is used to preserve most of image details.

For those who are skilled in the art, modification and changes can be made according to the above description. For example, according to one embodiment of the invention, the following program codes (1) and (2) can be used to optionally perform a deblock process in the horizontal direction on the macroblocks.

The program code (1) is used to acquire the first and second deblocking gains.

```
blockhedge(i,j) = absdiff(i,j) >= blockedgeh_min &&
                  absdiff(i,j) <= blockedgeh_max;
absdiff_adj(i,j) = (absdiff(i,j-1) + absdiff(i,j)*2 + asdiff(i,j+1))
                  * 0.5;
if (absdiff_adj(i,j) >diff_th)
   absdiff_adj_mod(i,j) = absdiff_adj(i,j) -diff_th;
else
   absdiff_adj_mod(i,j) = 0;
end
gain1(i,j) = gain_init-absdiff_adj_mod(i,j) * gain_slope;
gain2(i,j) = gain1(i,j) *gain2_factor;
```

The program code (2) is used to decrease the luminance difference between pixels. It should be noted that, in one embodiment, the deblock process (or low-pass filter) in the horizontal direction may not be executed for every block boundary but the deblock process (or low-pass filter) in the horizontal direction is needed only for the luminance difference between two adjacent boundary pixels blockhedge(i,j) being between blockedgeh_min and blockedgeh_max.

```
if(blockh_offset_valid)
   for i=1:rowsize
      for j=1:colsize
         for k = 1:3
            if ((mod(j,8) + 1) == blockh_offset_save&&
               blockhedge(i,j))
               data(i,j,k) = (data(i,j-1,k) * gain1(i,j) +
                           data(i,j,k) * (128 -gain1(i,j) *2 ) +
                           data(i,j+1,k) * gain1(i,j))/ 128;
               data(i,j+1,k) = (data(i,j,k) * gain1(i,j) +
                           data(i,j+1,k) * (128 -gain1(i,j) * 2) +
                           data(i,j+2,k) * gain1(i,j)) / 128;
               data(i,j-1,k) = (data(i,j-2,k) * gain2(i,j) +
                           data(i,j-1,k) * (128 -gain2(i,j) * 2) +
                           data(i,j,k) * gain2(i,j)) / 128;
               data(i,j+2,k) = (data(i,j+1,k) * gain2(i,j) +
                           data(i,j+2,k) * (128 -gain2(i,j) * 2) +
                           data(i,j+3,k) * gain2(i,j)) / 128;
            end
         end
      end
   end
end
```

In one embodiment, the predetermined values are set as follows: gain_init=40; diff_th=32; gain_slope=¼; and gain2_factor=0.75.

It should be noted that so far the embodiments to determine the block boundaries of the vertical direction and to utilize the horizontal deblock filter to have the block boundaries of the vertical direction be blurred are introduced. For those who are skilled in the art, according to the above examples, the block boundaries of the horizontal direction can be determined and the vertical deblock filter can be utilized to have the block boundaries of the vertical direction be blurred.

The deblock method according to one embodiment of the invention can be implemented by hardware, software, or firmware, or any combination of the above three. For instance, the example of using pure hardware is field programmable gate array (FPGA) design or application specific integrated circuit (ASIC) design while the example of using the combination of hardware and firmware is the combination of a digital signal processor (DSP) and the built-in firmware thereof.

Figure 11:
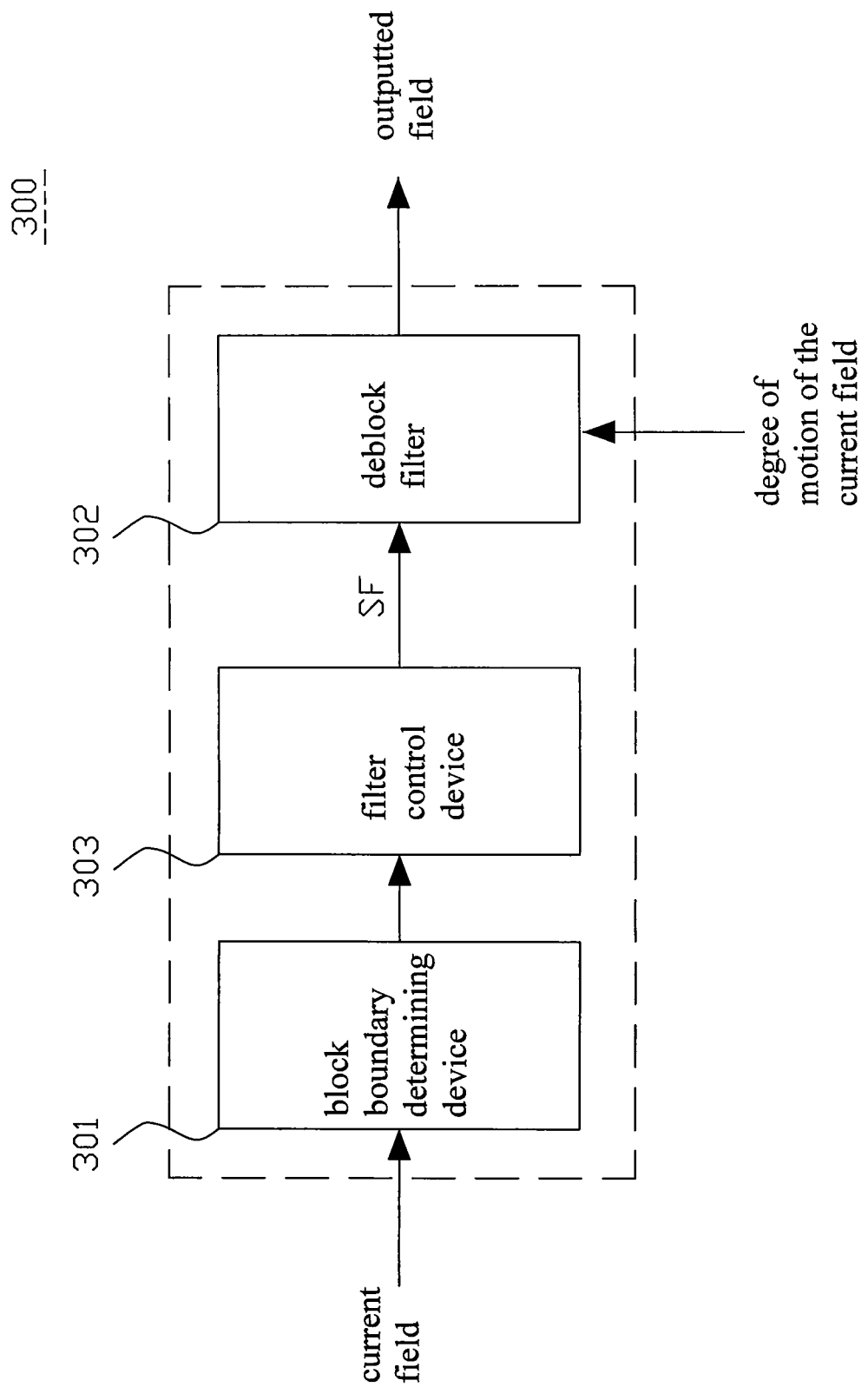
FIG. 11 shows a functional block diagram illustrating the image processing apparatus according to one embodiment of the invention.

FIG. 11 shows a functional block diagram illustrating the image processing apparatus according to one embodiment of the invention. According to one embodiment of the invention, the image processing apparatus 300 is to process a video comprising at least a field so as to remove the block effect of the field. The image processing apparatus 300 comprises a block boundary determining device 301, a deblock filter 302 and a filter control device 303. The block boundary determining device 301 is to determine a shift amount of block boundary of the field by utilizing pixel data differences between adjacent pixels in a first direction (either horizontal or vertical direction, in this embodiment being horizontal direction) in the current field to thereby determine block boundaries of the vertical direction between adjacent macroblocks in the field. The deblock filter 302 is to optionally perform a deblock process in the horizontal direction on the block boundaries of the vertical direction. The filter control device 303 is to determine whether the shift amount of block boundary is reliable or not to thereby decide the value of a filter selection signal SF. In one embodiment, the deblock filter 302 can optionally perform a deblock process in the horizontal direction on the block boundaries of the vertical direction according to the filter selection signal. In one embodiment, the deblock filter 302 comprises a low-pass filter. In one embodiment, the deblock filter 302 adjusts the amplitude of the deblock effect thereof according to the degree of motion of the current field. As the current field tends to be high motion, the deblock effect of the deblock filter 302 is stronger. On the contrary, as the current field tends to be static, the deblock effect of the deblock filter 302 is weaker.

Referring to FIG. 5 and FIG. 11, since the image processing apparatus 300 according to one embodiment of the invention comprises the block boundary determining device 301 to determine the block boundaries in the vertical direction in the image 210*a*, the image processing apparatus 300 may reduce the block effect according to these block boundaries so as to have better image quality.

Although the present invention has been fully described by the above embodiments, the embodiments should not constitute the limitation of the scope of the invention. Various modifications or changes can be made by those who are skilled in the art without deviating from the spirit of the invention.

What is claimed is:

1. A deblock method, for processing at least one image comprising a plurality of pixels, the method comprising:
   determining a shift amount of each of a plurality of block boundaries of the image by utilizing first pixel data differences between adjacent pixels in the image in a first direction to thereby determine block boundaries of a second direction between adjacent macroblocks in the image; and
   optionally performing a deblock process in the first direction on the block boundaries of the second direction;
   wherein the first direction is either a horizontal or vertical direction and the second direction is perpendicular to the first direction;
   wherein the step of determining the block boundaries of the second direction between adjacent macroblocks in the image comprises:
   categorizing the plurality of pixels into a plurality of groups in the first direction according to the size of the macroblocks;
   for each pixel in each group (referred to as a target pixel) sequentially using the first pixel data differences of a plurality of consecutive pixels including said target pixel to acquire a pixel boundary characteristic value for said target pixel, wherein the pixel boundary characteristic value of the target pixel is set to a first weight value when the first pixel data differences of the plurality of consecutive pixels satisfy a characteristic relation of the block boundary of the macroblocks, otherwise the pixel boundary characteristic value of the target pixel is set to a second weight value;
   increasing the weight of said target pixel by a first default value if both said target pixel and its preceding pixel in the same group satisfy the characteristic relation of the block boundary of the macroblocks;
   accumulating the weights of the pixels for each group separately; and
   determining the shift amount of each of the block boundaries according to the group having the maximum accumulated weights of the pixels.

2. The method according to claim 1, further comprising: determining whether the shift amount of each of the block boundaries is reliable or not to thereby decide the value of a filter selection signal.

3. The method according to claim 2, wherein the step of optionally performing a deblock process on the block boundaries comprises optionally performing a deblock process in the first direction on the block boundaries of the second direction according to the filter selection signal.

4. The method according to claim 3, wherein at least one image is a plurality of images to form a video.

5. The method according to claim 1, wherein the step of determining the block boundaries of the second direction between adjacent macroblocks in the image further comprises:
   fixing the weight at a second default value when the weight is increased greater than or equal to the second default value.

6. The method according to claim 2, wherein the step of determining whether the shift amount of each of the block boundaries is reliable or not comprises determining whether the shift amount of each of the block boundaries is reliable or not according to the maximum accumulated weights of the pixels.

7. The method according to claim 6, wherein the step of determining whether the shift amount of each of the block boundaries is reliable or not further comprises calculating a degree of unreliability of the shift amount of each of the block boundaries if the shift amount of each of the block boundaries is unreliable and setting the value of the filter selection signal to a disable filter value if the degree of unreliability is beyond a threshold value of unreliability.

8. The method according to claim 7, wherein the step of determining whether the shift amount of each of the block boundaries is reliable or not further comprises: calculating a degree of reliability of the shift amount of each of the block boundaries if the shift amount of each of the block boundaries is reliable and setting the value of the filter selection signal to an enable filter value if the degree of reliability is beyond a threshold value of reliability.

9. The method according to claim 8, wherein the step of calculating the degree of reliability of the shift amount of each of the block boundaries comprises the step of using the relation between the shift amount of each of the block boundaries of the image and a preceding shift amount of each of the block boundaries of a preceding image to calculate the degree of reliability of the shift amount of each of the block boundaries of the image.

10. The method according to claim 9, wherein the step of calculating the degree of reliability of the shift amount of each of the block boundaries comprises increasing the degree of reliability while the shift amount of each of the block boundaries of the image is equal to the preceding shift amount of each of the block boundaries of the preceding image and decreasing the degree of reliability while the shift amount of each of the block boundaries of the image is different from the preceding shift amount of each of the block boundaries of the preceding image.

11. The method according to claim 1, wherein the step of optionally performing a deblock process in the first direction on the block boundaries of the second direction uses a low-pass filter to execute.

12. The method according to claim 11, wherein the low-pass filter uses at least one deblocking gain and a constant value to acquire a plurality of adjusting coefficients and uses the adjusting coefficients and pixel data of a boundary pixel and a plurality of adjacent pixels to adjust the pixel data of the boundary pixel, wherein the boundary pixel and the adjacent pixels line up in the first direction and the constant value is greater than the at least one deblocking gain; and wherein the at least one deblocking gain is obtained according to a second pixel data difference of the boundary pixel associated with the first pixel data differences between the boundary pixel and the adjacent pixels.

13. The method according to claim 12, wherein the low-pass filter uses a first deblocking gain and the constant value to adjust the pixel data of the boundary pixel when the first pixel data difference of the boundary pixel is between a first boundary threshold value and a second boundary threshold value.

14. The method according to claim 13, wherein the adjacent pixels comprise a first pixel and a second pixel; wherein the boundary pixel is positioned between the first pixel and the second pixel; wherein the first deblocking gain is obtained according to the second pixel data difference of the boundary pixel associated with the first pixel data difference between the first pixel and the boundary pixel and the first pixel data difference between the second pixel and the boundary pixel, such that gain1=gain_init−(absdiff_adj−diff_th)*gain_slope; wherein gain1 is the first blocking gain and absdiff_adj is the second pixel data difference of the boundary pixel; and wherein diff_th, gain_init and gain_slope are preset values.

15. The method according to claim 13, wherein the low-pass filter further uses a second deblocking gain and the constant value to adjust the pixel data of the adjacent pixels and the second deblocking gain is less than the first deblocking gain.

16. The method according to claim 11, wherein the low-pass filter further adjusts the filtering amplitude thereof according to the degree of motion of the image.

17. The method according to claim 14, wherein the low-pass filter further adjusts the diff_th and gain_init values according to the degree of motion of the image.

18. The method according to claim 12, wherein the first and the second pixel data differences are luminance differences or chrominance differences.

19. An image processing apparatus for processing at least one image comprising a plurality of pixels, the apparatus comprising:
a block boundary determining device, determining a shift amount of each of a plurality of block boundaries of the image by utilizing first pixel data differences between adjacent pixels in the image in a first direction to thereby determine block boundaries of a second direction between adjacent macroblocks in the image; and
a deblock filter, optionally performing a deblock process in the first direction on the block boundaries of the second direction;
wherein the first direction is either a horizontal or vertical direction and the second direction is perpendicular to the first direction;
wherein the block boundary determining device categorizes the plurality of pixels into a plurality of groups in the first direction according to the size of the macroblocks and for each pixel in each group (referred to as a target pixel) sequentially uses the first pixel data differences of a plurality of consecutive pixels including said target pixel to acquire a pixel boundary characteristic value for said target pixel;
wherein the pixel boundary characteristic value of the target pixel is set to a first weight value when the first pixel data differences of the plurality of consecutive pixels satisfy a characteristic relation of the block boundary of the macroblocks, otherwise the pixel boundary characteristic value of the target pixel is set to a second weight value;
wherein the weight of said target pixel is increased by a first default value if both said target pixel and its preceding pixel in the same group satisfy the characteristic relation of the block boundary of the macroblocks; and
wherein the block boundary determining device accumulates the weights of the pixels for each group separately and determines the shift amount of each of the block boundaries according to the group having the maximum accumulated weights of the pixels.

20. The apparatus according to claim 19, further comprising:
a filter control device, determining whether the shift amount of each of the block boundaries is reliable or not to thereby decide the value of a filter selection signal.

21. The apparatus according to claim 19, wherein the deblock filter optionally performs a deblock process in the first direction on the block boundaries of the second direction according to the filter selection signal.

22. The apparatus according to claim 19, wherein the deblock filter comprises a low-pass filter.

23. The apparatus according to claim 22, wherein the low-pass filter further adjusts the filtering amplitude thereof according to the degree of motion of the image.

24. The apparatus according to claim 22, wherein the low-pass filter uses at least one deblocking gain and a constant value to acquire a plurality of adjusting coefficients and uses the adjusting coefficients and pixel data of a boundary pixel and a plurality of adjacent pixels to adjust the pixel data of the boundary pixel, wherein the boundary pixel and the adjacent pixels line up in the first direction and the constant value is greater than the at least one deblocking gain; and wherein the at least one deblocking gain is obtained according to a second pixel data difference of the boundary pixel associated with the first pixel data differences between the boundary pixel and the adjacent pixels.

25. The apparatus according to claim 24, wherein the low-pass filter uses a first deblocking gain and the constant value to adjust the pixel data of the boundary pixel when the first pixel data difference of the boundary pixel is between a first boundary threshold value and a second boundary threshold value.

26. The apparatus according to claim 25, wherein the adjacent pixels comprise a first pixel and a second pixel; the boundary pixel is positioned between the first pixel and the second pixel; wherein the first deblocking gain is obtained according to the second pixel data difference of the boundary pixel associated with the first pixel data difference between the first pixel and the boundary pixel and the first pixel data difference between the second pixel and the boundary pixel, such that gain1=gain_init−(absdiff_adj−diff_th)*gain_slope; wherein gain1 is the first blocking gain and absdiff_adj is the second pixel data difference of the boundary pixel; and wherein diff_th, gain_init and gain_slope are preset values.

27. The apparatus according to claim 25, wherein the low-pass filter further uses a second deblocking gain and the constant value to adjust the pixel data of the adjacent pixels and the second deblocking gain is less than the first deblocking gain.

28. The apparatus according to claim 26, wherein the low-pass filter further adjusts the diff_th and gain_init values according to the degree of motion of the image.

29. The apparatus according to claim 24, wherein the first and the second pixel data differences are luminance differences or chrominance differences.

30. The apparatus according to claim 19, wherein the weight is fixed to a second default value when the weight is increased greater than or equal to the second default value.

* * * * *